(12) United States Patent
Magg

(10) Patent No.: US 9,423,679 B2
(45) Date of Patent: Aug. 23, 2016

(54) PROJECTION UNIT AND METHOD FOR CONTROLLING THE PROJECTION UNIT

(75) Inventor: Norbert Magg, Berlin (DE)

(73) Assignee: OSRAM GmbH, Munich (DE)

( * ) Notice: Subject to any disclaimer, the term of this patent is extended or adjusted under 35 U.S.C. 154(b) by 25 days.

(21) Appl. No.: 14/237,353

(22) PCT Filed: Jun. 25, 2012

(86) PCT No.: PCT/EP2012/062247
§ 371 (c)(1),
(2), (4) Date: Feb. 6, 2014

(87) PCT Pub. No.: WO2013/020751
PCT Pub. Date: Feb. 14, 2013

(65) Prior Publication Data
US 2014/0185020 A1    Jul. 3, 2014

(30) Foreign Application Priority Data
Aug. 9, 2011 (DE) .......................... 10 2011 080 641

(51) Int. Cl.
*G03B 21/20* (2006.01)
*G01J 1/42* (2006.01)
*G01J 1/02* (2006.01)
*G01J 5/02* (2006.01)
*G01J 5/08* (2006.01)

(52) U.S. Cl.
CPC ........... *G03B 21/2053* (2013.01); *G01J 1/0271* (2013.01); *G01J 1/4228* (2013.01); *G01J 1/4257* (2013.01); *G01J 5/025* (2013.01); *G01J 5/0893* (2013.01); *G03B 21/2046* (2013.01)

(58) Field of Classification Search
CPC .......................... H04N 9/3155; F21S 48/1388
USPC ............. 353/69, 70, 85, 97, 98; 362/277, 297
See application file for complete search history.

(56) References Cited

U.S. PATENT DOCUMENTS 3,841,743 A   10/1974   Thevenaz
4,519,694 A   5/1985   Kashiwagi et al.
(Continued)

FOREIGN PATENT DOCUMENTS

CN   101354461 A   1/2009
DE   10258990 A1   7/2004
(Continued)

OTHER PUBLICATIONS

English abstract of DE 10258990 A1 dated Jul. 1, 2004.
(Continued)

*Primary Examiner* — Sultan Chowdhury
(74) *Attorney, Agent, or Firm* — Viering, Jentschura & Partner mbB

(57) ABSTRACT

A projection unit may include a reflector-lamp arrangement which is designed to emit light during operation, wherein the light radiates toward an aperture, wherein a setting unit is provided, with which a light intensity distribution of the emitted light is adjustable relative to the aperture, wherein the light intensity distribution is adjusted depending on a period of operation of the lamp, and/or a measuring unit is provided, with which at least part of the light intensity distribution is detectable, wherein the light intensity distribution is adjusted relative to the aperture depending on a change in the light intensity distribution.

17 Claims, 7 Drawing Sheets

(56) References Cited

U.S. PATENT DOCUMENTS

| | | | |
|---|---|---|---|
| 5,200,603 A | 4/1993 | Hackenberg et al. | |
| 5,646,716 A * | 7/1997 | Nagashima | 355/67 |
| 7,438,420 B2 * | 10/2008 | Harada et al. | 353/30 |
| 7,994,734 B2 | 8/2011 | Breuer et al. | |
| 8,602,566 B2 | 12/2013 | Baier et al. | |
| 2002/0085387 A1 * | 7/2002 | Taniuchi | B60Q 1/085 362/538 |
| 2006/0007406 A1 * | 1/2006 | Adkins et al. | 353/82 |
| 2007/0279907 A1 * | 12/2007 | Goto et al. | 362/277 |
| 2008/0218702 A1 * | 9/2008 | Koyama | G03B 21/20 353/85 |
| 2009/0027794 A1 | 1/2009 | Lin | |
| 2009/0168041 A1 * | 7/2009 | Sawai | 355/71 |
| 2009/0262313 A1 | 10/2009 | Rehn | |

FOREIGN PATENT DOCUMENTS

| | | |
|---|---|---|
| DE | 102008019648 A1 | 10/2009 |
| DE | 102009006338 A1 | 9/2010 |
| EP | 0514728 A1 | 11/1992 |
| JP | S4843332 A | 6/1973 |
| WO | 2008071232 A1 | 6/2008 |
| WO | 2010086222 A1 | 8/2010 |

OTHER PUBLICATIONS

International Search Report issued in the corresponding PCT application No. PCT/EP2012/062247.
Chinese Search Report based on Application No. 201280038906l(2 Pages of English translation) dated Mar. 24, 2015 (Reference Purpose Only).

* cited by examiner

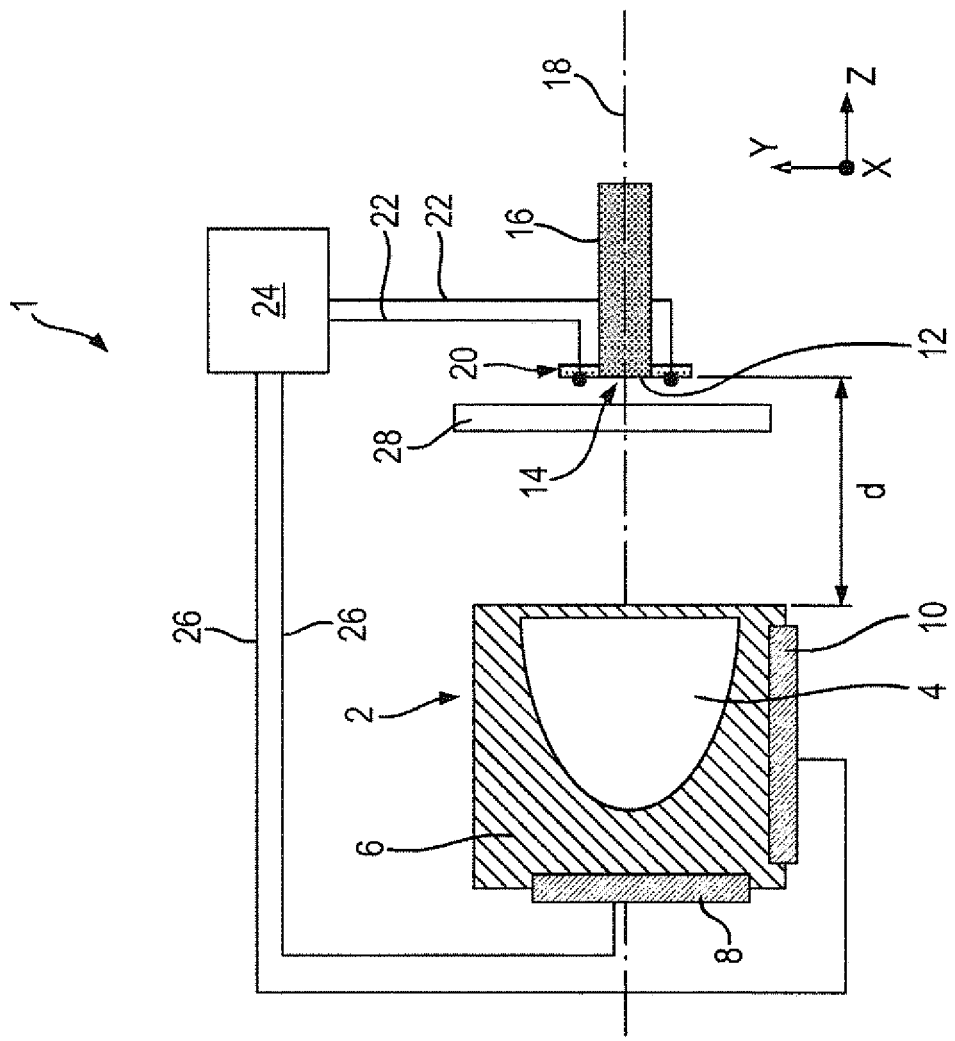
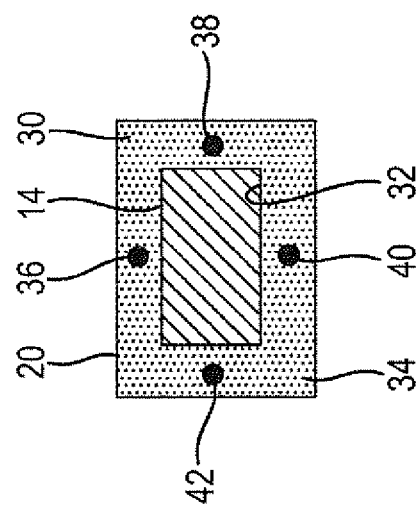
Fig.1
Fig.2

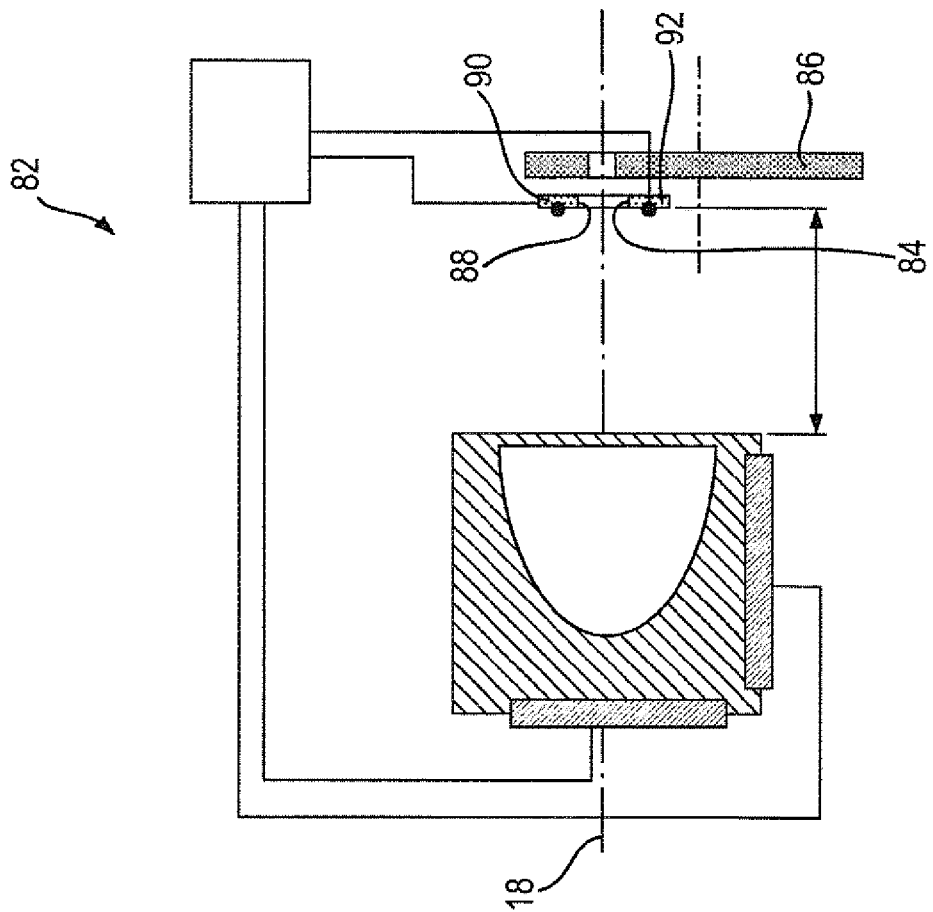
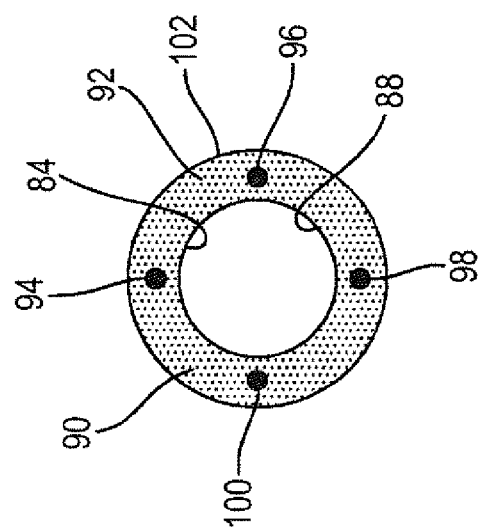
Fig. 8
Fig. 9

PROJECTION UNIT AND METHOD FOR CONTROLLING THE PROJECTION UNIT

RELATED APPLICATIONS

The present application is a national stage entry according to 35 U.S.C. §371 of PCT application No.: PCT/EP2012/062247 filed on Jun. 25, 2012, which claims priority from German application No.: 10 2011 080 641.5 filed on Aug. 9, 2011, and is incorporated herein by reference in its entirety.

TECHNICAL FIELD

Various embodiments relate to a projection unit and a method for controlling the projection unit.

BACKGROUND

A multiplicity of projection units are known from the prior art. In this case, a distinction is made, in particular, between projection units for video projection, such as, for example, liquid crystal display (LCD), digital light processing (DLP) or liquid crystal on silicon (LCoS) projection units, which are used for example for video projection or digital cinema projection, and projection units for advertizing and entertainment applications, such as, for example, moving head or graphical optical blackout (Lobo) projection units. Projection units of this type usually use a discharge lamp for generating light.

In this case, the discharge vessels of the discharge lamps and thus the arc that forms between the electrodes are positioned axially in a parabolic or elliptic reflector. The arrangement of lamp and associated reflector is also designated hereinafter as reflector-lamp arrangement. With the use of an elliptic reflector, a light integrator for homogenizing the light radiation is usually disposed downstream of said reflector. The light integrator is followed by the imaging element of the projection unit and the projection optical system. The light thus radiates from the discharge lamp, positioned in a reflector, via an aperture to a projection optical system. In the case of a DLP projector, for example, the aperture is the area of the light entrance opening of the light integrator. For years the trend here has been toward ever smaller dimensions of the projection units, the size of the aperture also being reduced. In order furthermore to be able to achieve a high system efficiency, the discharge lamps are used with ever shorter arcs, i.e. shorter electrode spacings. This trend also applies to Gobo projectors and to digital cinema projection. Moreover, discharge lamps having ever higher powers are increasingly being used.

What is disadvantageous here is that, as a result of wear of the electrodes over the service life of the discharge lamp, the emission characteristic thereof (for example the spatial position and form of the arc between the electrodes and the luminance distribution of said arc) changes, as a result of which the light intensity distribution of the emitted light also changes relative to the aperture and can shift or change both in the aperture plane and perpendicularly thereto. This in turn has the effect that that proportion of the luminous flux of the discharge lamp which enters into the aperture generally decreases significantly over the service life on account of this change and shift, even though the total luminous flux emitted by the discharge lamp hardly changes.

SUMMARY various embodiments provide a projection unit whose luminous flux through its aperture is comparatively high over its service life. Various embodiments further provide a method for controlling a projection unit of this type.

In various embodiments, a projection unit has a light-emitting reflector-lamp arrangement, which, as light-generating element, has in particular a discharge lamp, for example an AC- or DC-operated metal-halide lamp or an AC-operated extra-high-pressure mercury lamp or a high-pressure noble-gas lamp. In this case, the discharge lamp is arranged in a reflector arrangement that focuses toward an aperture. Consequently, the light emitted by the reflector-lamp arrangement radiates towards an aperture. The discharge vessel of the discharge lamp can be fixedly integrated into an outer reflector and can be surrounded by the latter. In this case, the discharge lamp is preferably arranged axially in a reflector, as is the case, for example, for cinema projection lamps (both film and digital) with xenon short-arc lamps. As an alternative thereto, the discharge vessel can be arranged in or in front of a separate reflector, i.e. it need not necessarily be fixedly connected to the latter. In this case, the discharge vessel can be arranged axially or transversely with respect to the reflector axis.

A setting unit is provided, with which a light intensity distribution of the emitted light is adjustable relative to the aperture. The light intensity distribution is adjusted depending on a period of operation of the discharge lamp, and/or a measuring unit is provided, with which at least part of the light intensity distribution is detectable, wherein the light intensity distribution is adjusted relative to the aperture depending on a change in the light intensity distribution or a controlled variable—derived therefrom—of a measuring unit that measures the light intensity distribution or a characteristic variable derived therefrom.

This solution has the advantage that a change in the light intensity distribution relative to the aperture, for example on account of wear of electrodes of the discharge lamp, can be compensated for by the adjustment of the light intensity distribution by means of the setting unit relative to the aperture. Usually, in the case of a projection unit still having a short period of operation, the highest light intensity of the emitted light is situated in the region of the aperture, this region being designated as a hot spot. This hot spot normally shifts over the period of operation on account of electrode wear or electrode deformation of the projection unit away from the aperture, that is to say for example laterally into the aperture plane. By means of the projection unit according to the disclosure, the service life of the discharge lamp used and thus the useful life of the projection device can be significantly increased compared with the prior art, since the hot spot is moved in the direction of the aperture again by the setting unit. Furthermore, the solution according to the disclosure makes it possible to achieve a further miniaturization of projection units with the useful life remaining approximately the same, since the hot spot is made congruent with the aperture by readjustment.

Preferably, the setting unit adjusts the light intensity distribution of the emitted light relative to the aperture in such a way that a maximum of the light intensity distribution substantially lies in the aperture.

Advantageously, the measuring unit detects at least part of the light intensity distribution of a part of the luminous flux that does not radiate through the aperture. This has the effect that that part of the luminous flux which radiates through the aperture is substantially not disturbed by the measuring unit and is completely usable for the projection optical system. In this case, the light intensity distribution or the lateral offset thereof can also be measured indirectly, for example by means of temperature sensors which measure the heating of the mount surrounding the aperture opening, since, in the case of a light offset on one side, the corresponding side is heated to a greater extent.

In various embodiments, provision is made of a control unit for controlling the setting unit, wherein the control unit controls the setting unit depending on the light intensity distribution detected by the measuring unit and/or depending on the period of operation of the discharge lamp.

Preferably, the measuring unit has a plurality of sensors arranged outside the aperture, in particular substantially in an aperture plane, whereby that part of the luminous flux which does not radiate through the aperture is detectable by the measuring unit in a simple manner. The measuring unit includes, for example, light sensors and/or temperature sensors and/or a camera. In this case, the camera measures the distribution of the useful light on a projection surface.

For adjusting the light intensity distribution relative to the aperture, a position of the reflector-lamp arrangement and/or the position of the discharge lamp in relation to the reflector, and/or of an optical element between the reflector-lamp arrangement and the aperture, for example a mirror or a lens, and/or of the aperture can be changed by the setting unit.

In a simple configuration, the setting unit has at least one motor, in particular an electrical stepper motor, which, for the purpose of adjusting the light intensity distribution, can be used to change the position of the reflector-lamp arrangement and/or of the discharge lamp in relation to the reflector and/or of an optical element and/or of the aperture.

The setting unit can be designed as a pivoting unit, which, for the purpose of adjusting the light intensity distribution, can be used to pivot the reflector-lamp arrangement, and/or the position of the discharge lamp in relation to the reflector and/or an optical element and/or the aperture.

The projection unit is a digital light processing (DLP) projection unit or a liquid crystal display (LCD) projection unit or a liquid crystal on silicon (LCoS) projection unit or a graphical optical blackout (Gobo) projection unit or a cinema projection unit (film or digital).

The projection unit may also be designed as a multi-lamp system, in particular as a double- or quadruple-lamp arrangement, that is to say a system having one, two, or a plurality of reflector-lamp arrangements.

Advantageously, the lamp has electrodes whose geometry may be changed by an electronic electrode reconfiguration method (reshape method), as described for example in WO 2010086222, WO 2008071232 or DE 10 2009 006338. The method according to the disclosure now makes it possible, in a simple manner, after a reshape method, to re-establish the optimum position of the light intensity distribution with regard to the aperture opening.

Preferably, the setting unit adjusts the light intensity distribution relative to the aperture in the aperture plane approximately in 1/10 mm steps.

In various embodiments, a method for controlling a projection includes:
  detecting at least part of the light intensity distribution by means of the measuring unit,
  evaluating the light intensity distribution by means of an evaluation unit for the purpose of detecting changes in the light intensity distribution,
  adjusting the light intensity distribution of the emitted light relative to the aperture by means of the setting unit for the purpose of compensating for changes in the light intensity distribution;
  and/or including the following step:
  adjusting the light intensity distribution of the emitted light relative to the aperture by means of the setting unit in order to compensate for changes in the light intensity distribution depending on the operational life.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 1 shows a schematic illustration of a projection unit in accordance with a first embodiment;

FIG. 2 shows a front view of an aperture of the projection unit from FIG. 1;

FIG. 8 shows a schematic illustration of the projection unit in accordance with a fifth embodiment; and FIG. 9 shows a front view of the aperture of the projection unit from FIG. 8.

DETAILED DESCRIPTION

Figure 3:
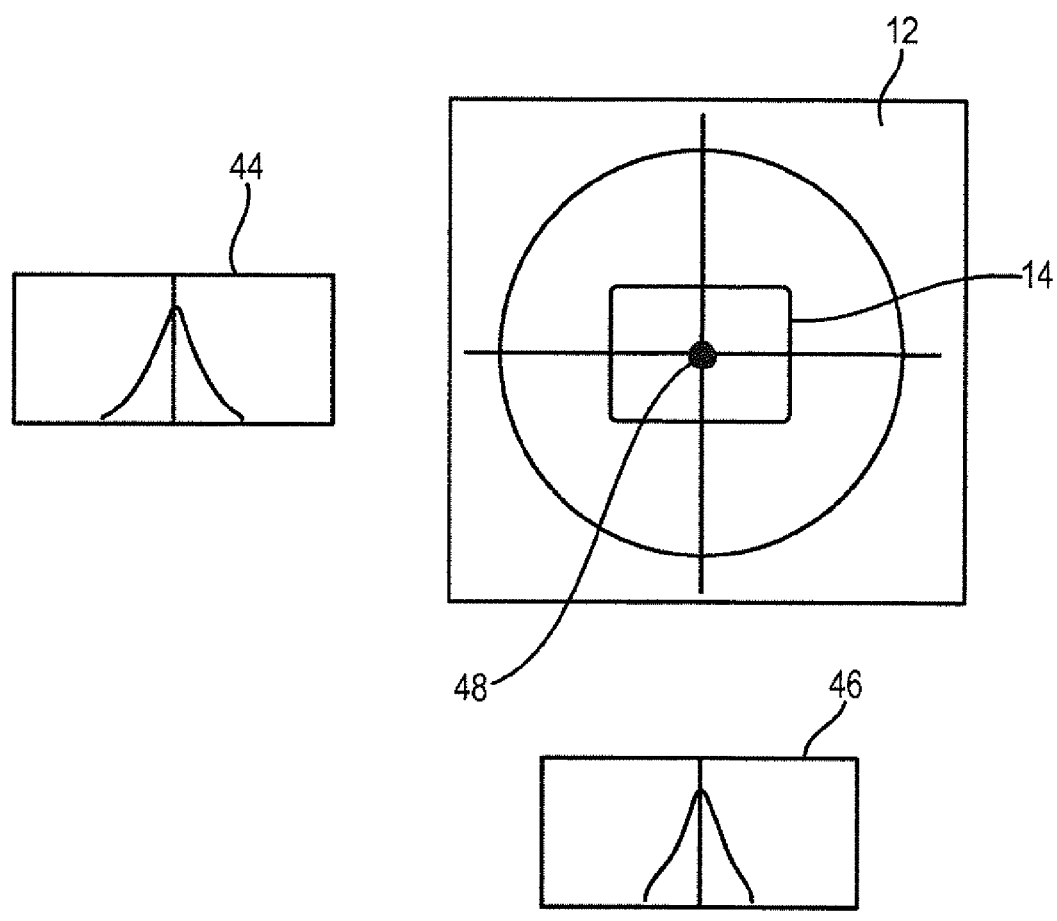
FIG. 3 shows a schematic illustration of a light intensity distribution in the region of the aperture from FIG. 2.

The following detailed description refers to the accompanying drawing that show, by way of illustration, specific details and embodiments in which the disclosure may be practiced.

FIG. 1 discloses a projection unit 1 in a schematic illustration in accordance with a first exemplary embodiment. This involves a digital light processing (DLP) projection unit 1. DLP projection units of this type are sufficiently known from the prior art, for which reason only what is essential to understanding the disclosure is presented below and reference is made to the prior art for more extensive explanations.

The projection unit 1 uses, as lamp module 2, an OSRAM P-VIP reflector-lamp arrangement arranged in a housing 6, said arrangement consisting of an elliptic reflector 4 and an extra-high-pressure mercury-vapor lamp (not illustrated) positioned axially therein. A discharge lamp of this type is known from the document DE 10 2008 019 648 A1, for example. The lamp housing 6 is operatively connected to three motors 8, 10, in particular electric stepper motors, only two motors 8 and 10 being illustrated in FIG. 1. The lamp housing 6 is movable in a y-direction (which is the vertical direction in FIG. 1) by means of the motor 8 on the left in FIG. 1 and in a z-direction (which is the horizontal direction in FIG. 1) by means of the motor 10 arranged at the bottom. By means of the motor that is not illustrated, the lamp housing 6 is movable approximately perpendicularly to the plane of the drawing in FIG. 1 in an x-direction.

Light emitted by the discharge lamp (not illustrated) is focused via the reflector 4 substantially in an aperture plane 12 of an aperture 14. The aperture 14 forms an entrance opening of an integrator 16, which is arranged approximately coaxially with respect to the optical axis 18 of the projection unit 1. In this case, the aperture 14 is spaced apart substantially at an operating distance d from an exit opening of the reflector 4, wherein a midpoint of the aperture is generally arranged in the region of the optical axis 18. A measuring unit 20 is arranged outside the aperture 14, approximately in the aperture plane 12, in order to detect changes in the light intensity distribution of the light emitted by the discharge lamp. The measuring unit 20 together with the aperture 14 are explained in greater detail below in FIG. 2.

The measuring unit 20 is connected via electrical lines 22 to an evaluation and control unit (ASIC) 24. The latter in turn is connected via electrical lines 26 to the motors 8 and 10 and the motor that is not illustrated, in order to drive them. A conventional color wheel 28 that is customary for DLP projection units is arranged between the integrator 16 and the lamp module 2.

FIG. 2 illustrates a front view of the aperture 14 together with the measuring unit 20 from FIG. 1. The aperture 14 has an approximately rectangular cross section having two long and two short sides. The measuring unit 20 has a rectangular holding plate 30, in which the rectangular aperture opening 14 is formed. A front side 34 of the holding plate 30, said front side facing the lamp module 2, lies approximately in the aperture plane 12 from FIG. 1. The measuring unit 20 has four sensors 36, 38, 40 and 42 arranged fixedly on the holding plate 30. A respective sensor 36, 38, 40 or 42 is arranged approximately centrally on the plate 30 in the region of a respective side outside the rectangular aperture 14, a distance from the aperture 14 being extremely small. The sensors 36 to 42 thus likewise lie approximately in the region of the aperture plane 12 from FIG. 1.

Part of the light intensity distribution of the light emitted by the discharge lamp is detectable by means of the sensors 36 to 42. The sensors 36 to 42 are, in particular, light sensors or temperature sensors. If light sensors are used as sensors 36 to 42, then a respective sensor 36 to 42 measures the radiation quantity of the light emitted by the discharge lamp which impinges on it over time.

If an emission characteristic of the discharge lamp (not illustrated) changes, as is typical in the course of the operational life, that can lead to a shift and widening of a hot spot of the light, said hot spot being generated by the focusing and arranged in the region of the aperture. As a consequence, the system efficiency of the projection unit 1 can decrease significantly even after a short operational life, even though the total quantity of light emitted by the discharge lamp decreases only little in this time period. If, for example, the radiation quantity of the light detected by the upper sensor 36 in FIG. 2 increases by a specific value—on account of the change in the emission characteristic—then this is detected by the evaluation and control unit 24, which thereupon drives the motor 8 in order to move the lamp housing 6 together with the reflector 4 and the discharge lamp downward in the y-direction in FIG. 1, as a result of which the radiation quantity detected by the sensor 36 decreases. In this case, the lamp housing 6 is shifted by the motor 8 in the y-direction until the radiation quantity detected by the sensors 36 to 42 is substantially the same. The evaluation and control unit 24 therefore passes pulses to the stepper motor 8 until the total radiation quantity detected by the sensors 36 to 42 is homogeneously distributed again and has assumed a minimum.

As an alternative to shifting the lamp housing 6 by means of the motors 8 and 10, it is conceivable to adjust the aperture 14 and/or the integrator 16 by means of motors, in order to react to changes in the hot spot or the emission characteristic of the light emitted by the discharge lamp.

If temperature sensors are used as sensors 36 to 42, then for example a change in the light intensity distribution in the direction of the upper sensor 36 in FIG. 2, that is to say that the radiation quantity becomes greater in this region, leads to an increase in a temperature in the region of the sensor 36, which is then detected by the latter. The evaluation and control unit 24 then shifts the lamp housing 6 downward in the y-direction in FIG. 1 by means of the motor 8 until the temperatures measured by the sensors 36 to 42 are substantially homogeneous again.

Figure 4:
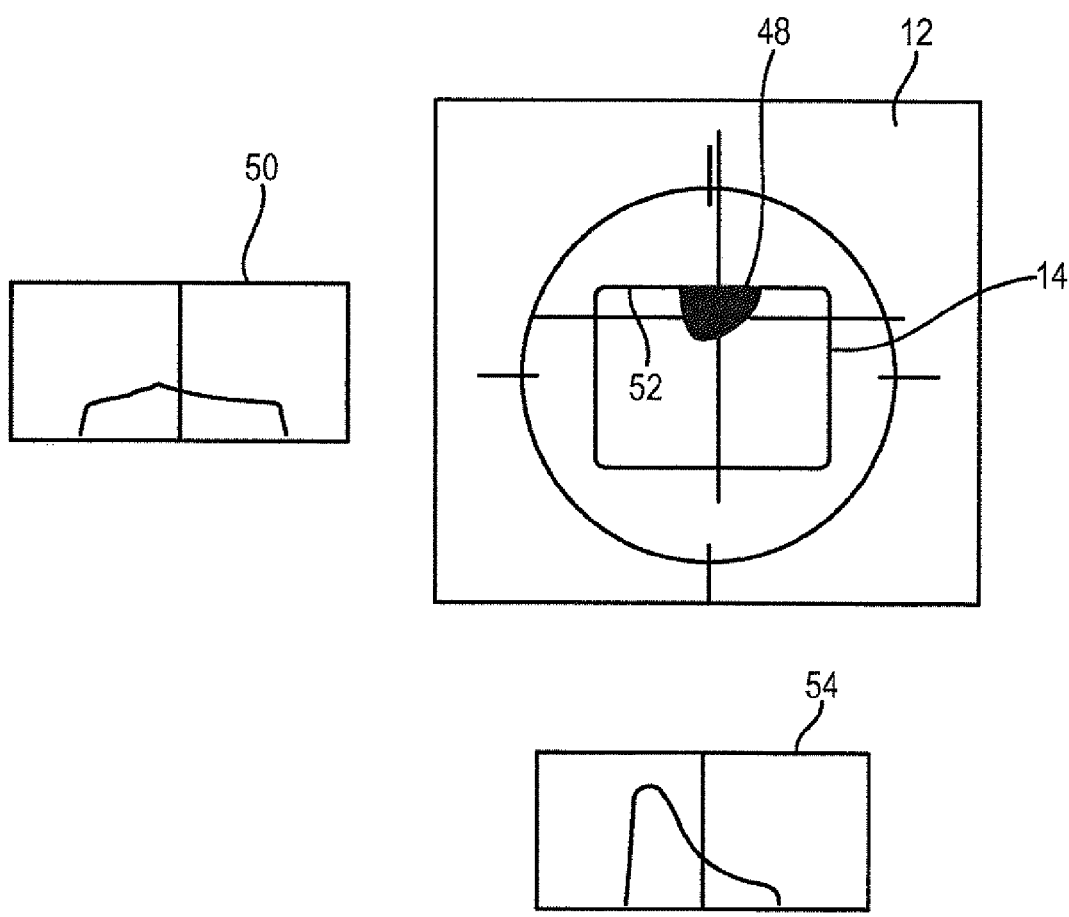
FIG. 4 shows a schematic illustration of a light intensity distribution in the region of the aperture from FIG. 2.

FIGS. 3 and 4 illustrate by way of example the light intensity distribution of the light emitted by the discharge lamp from FIG. 1 in the region of the aperture plane 12. In this case, FIG. 3 illustrates the aperture 14 together with the light intensity distribution in the case of a duration of operation of 0 h (hours) of the discharge lamp. In this case, the aperture 14 has a size of approximately 5×3.8 mm (millimeters). The luminous flux passing through the aperture is approximately 14500 lm (lumens). A mapping 44 in FIG. 3 illustrates a function graph of the light intensity distribution measured approximately along a measurement line extending horizontally in FIG. 3 approximately through a center of the aperture 14. A mapping 46 shows a function graph of the light intensity distribution along a measurement line extending approximately vertically in FIG. 3 approximately through the center of the aperture 14. It can be discerned here that the region of the highest light intensity is formed approximately centrally with respect to the aperture 14. This region is the so-called hot spot 48.

FIG. 4 shows the light intensity distribution of the light emitted by the discharge lamp in the region of the aperture 14 after a duration of operation of the discharge lamp of 1700 h. The luminous flux passing through the aperture having a size of approximately 5×3.8 mm is approximately 4440 lm. The mapping in FIG. 4 illustrates a function graph of the light intensity distribution measured approximately along a measurement line extending horizontally in FIG. 4 approximately in the upper region of the aperture 14. It can be discerned here that the light intensity distribution is distributed substantially uniformly along said measurement line, as a result of which the hot spot has widened in this direction. The mapping 54 shows a function graph of the light intensity distribution along a measurement line extending approximately vertically in FIG. 3 approximately through the center of the aperture 14. It is evident that a light intensity prevailing in an upper region of the aperture 14 is significantly greater than that prevailing in the lower region. Consequently, the hot spot 48 from FIG. 3 has shifted upward in FIG. 4 after a duration of operation of 1700 h. This shift is detected by the sensor 36 from FIG. 2, wherein said sensor measures for example an increased luminous flux or an increased temperature. The hot spot 48 is then shifted in the direction of the center of the aperture 14 again by the methods described in FIGS. 1 and 2, that is to say that the maximum of the light intensity distribution in mapping 54 is situated in the region of the midpoint of the aperture 14 again after the method. The luminous flux radiating through the aperture 14 after the hot spot 48 has been shifted is then significantly higher and is approximately 6030 lm.

0.1 mm has proved to be extremely advantageous as step size of the motors 8, 10, designed as stepper motors, and the motor that is not illustrated from FIG. 1.

Figure 5:
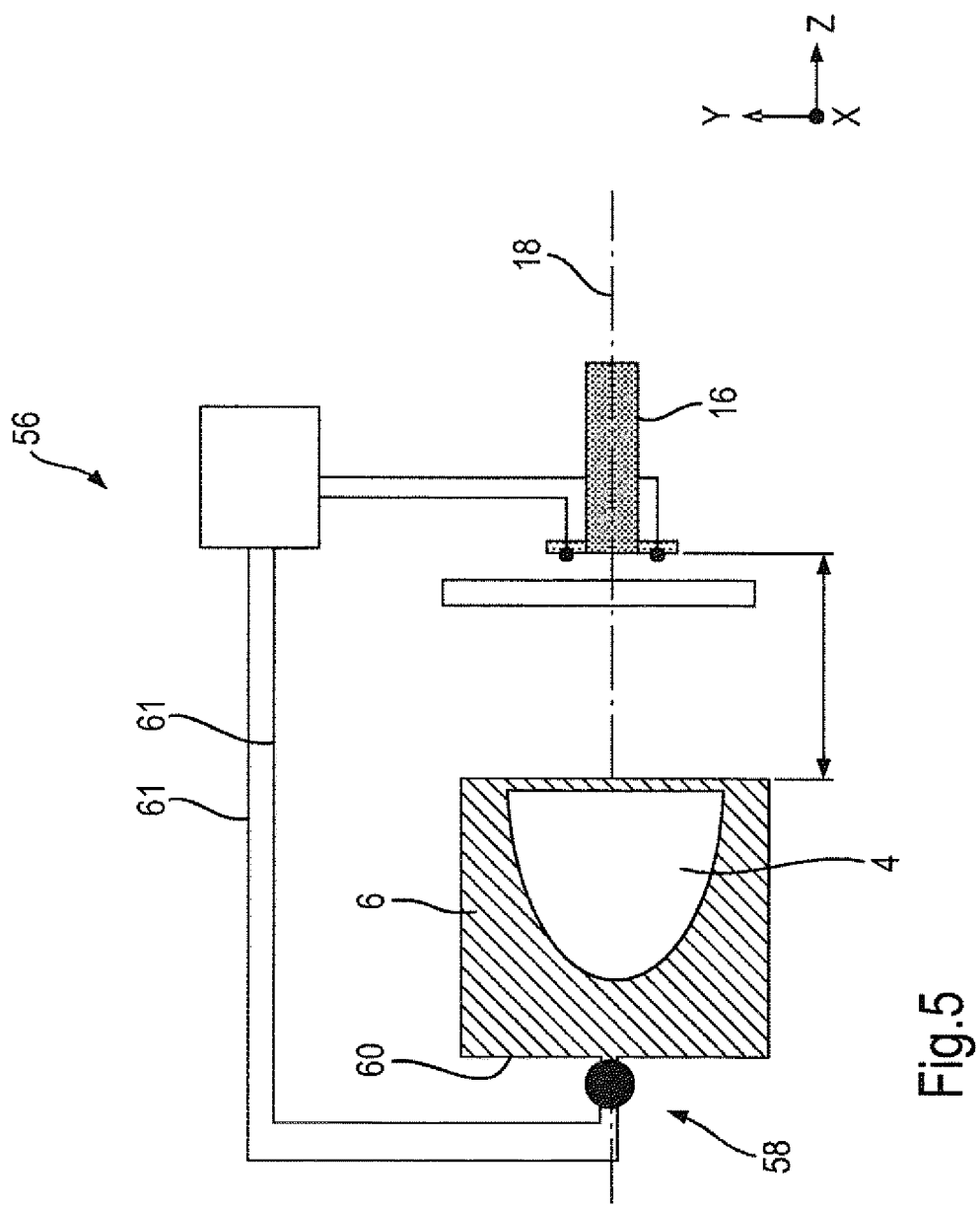
FIG. 5 shows a schematic illustration of the projection unit in accordance with a second embodiment.

FIG. 5 illustrates a schematic illustration of a second embodiment of the projection unit 56. In contrast to the projection unit 1 from FIG. 1, the lamp housing 6 is not adjusted by means of motors or stepper motors, but rather by means of a pivoting unit 58. The latter in this case is operatively connected to the lamp housing 6 in the region of the optical axis 18 on a rear housing side 60 of the housing 6, said rear housing side facing away from the integrator 16. In this case, the pivoting unit 58 is designed in such a way that it can pivot the housing 6 together with the reflector 4 about an x-axis, and/or a y-axis and/or a z-axis—see FIG. 5. The pivoting unit 58 is connected to the evaluation and control unit via electrical lines 61.

Figure 6:
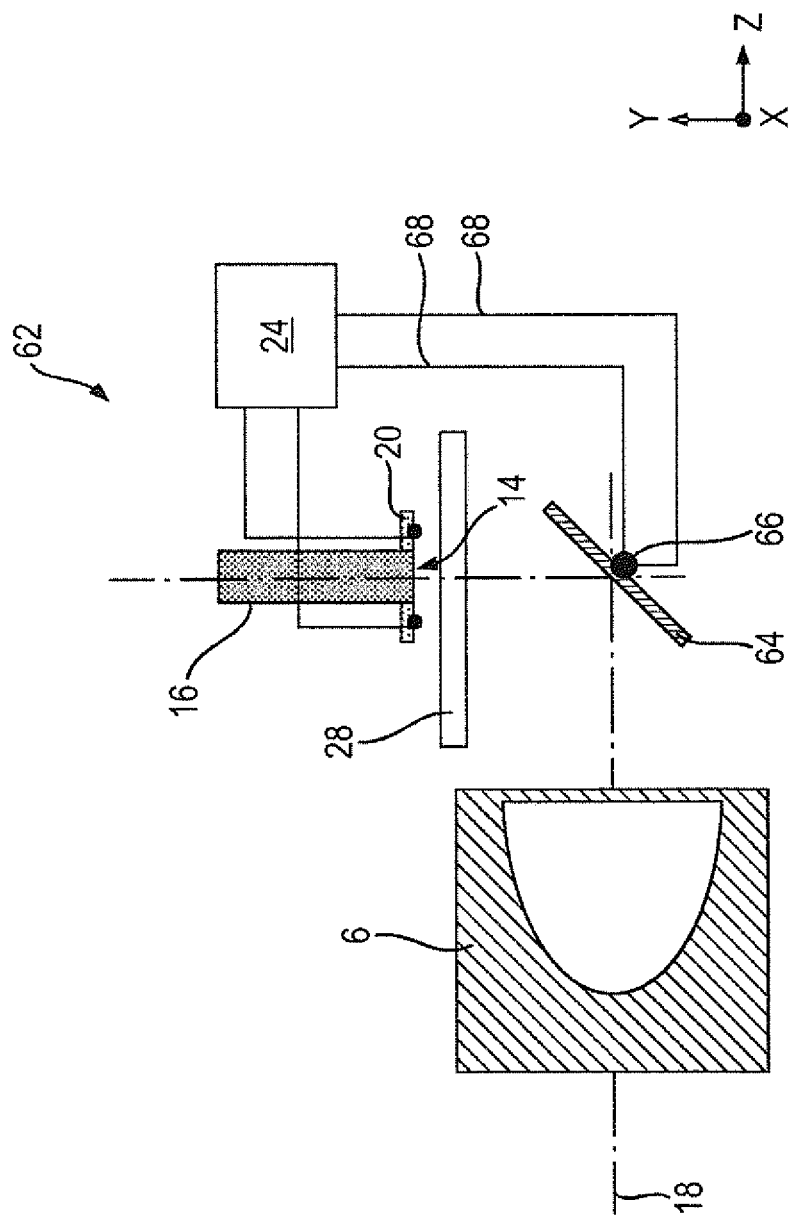
FIG. 6 shows a schematic illustration of the projection unit in accordance with a third embodiment.

FIG. 6 shows a schematic illustration of a projection unit 62 in accordance with a third embodiment. In contrast to the previous embodiments, the lamp housing 6 is fixedly mounted and a deflection mirror 64 with a pivoting unit 66 is arranged in the beam path between the discharge lamp (not illustrated) and the integrator 16. The integrator 16 together with the aperture 14, the measuring unit 20 and the color wheel 28 are arranged substantially perpendicularly to the optical axis 18 in FIG. 6. The light emitted by the discharge lamp (not illustrated) is deflected toward the aperture 14 by means of the deflection mirror 64. A change in the light intensity distribution or in the hot spot, see FIGS. 3 and 4, is compensated for by the pivoting unit 66 instead of motors 8, 10 from FIG. 1 or a pivoting unit 58 from FIG. 5, wherein the pivoting unit 66 pivots the deflection mirror 64 about the x-axis, y-axis and/or z-axis. The pivoting unit 66 is connected to the evaluation and control unit 24 via electrical lines 68.

Figure 7:
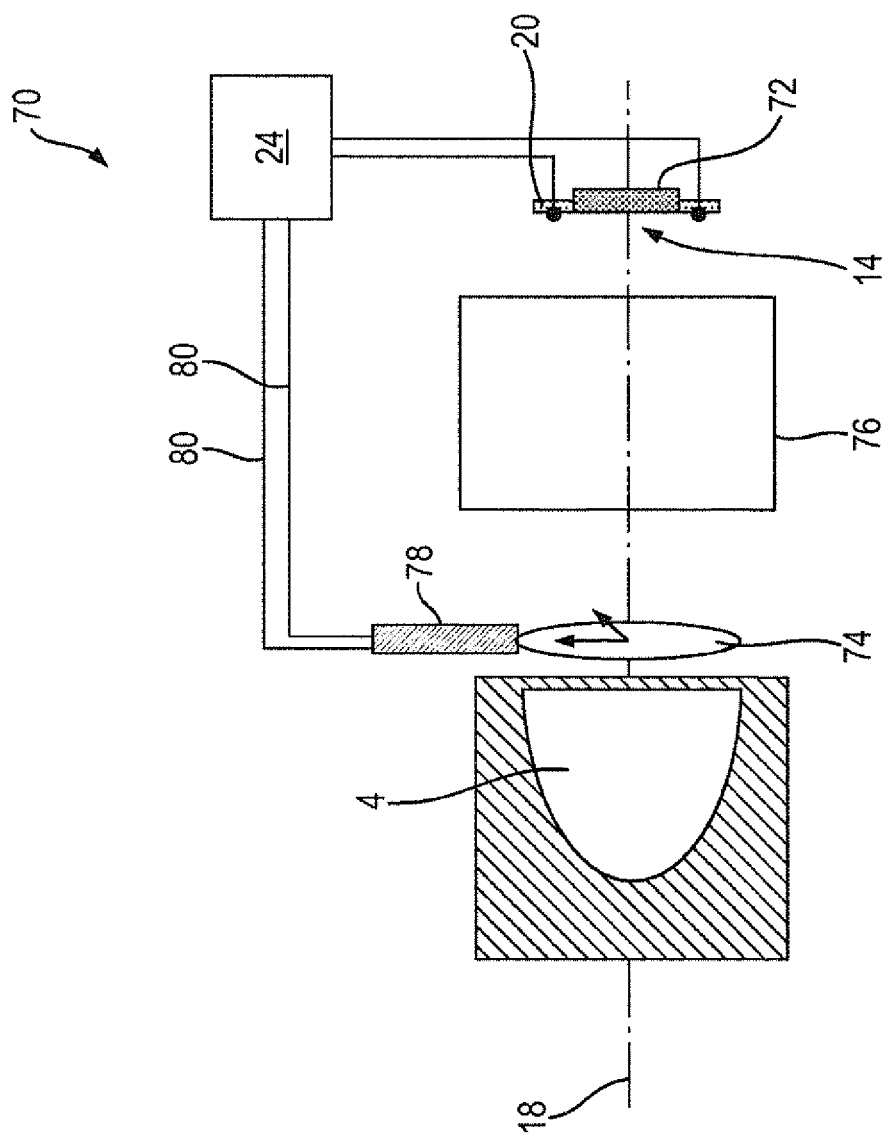
FIG. 7 shows a schematic illustration of the projection unit in accordance with a fourth embodiment.

FIG. 7 shows a schematic illustration of a projection unit 70 in accordance with a fourth embodiment. This involves a liquid crystal display (LCD) projection unit or a liquid crystal on silicon (LCoS) projection unit. Projection units of this type are sufficiently known from the prior art, for which reason only what is essential to understanding the disclosure is presented below and reference is made to the prior art for more extensive explanations.

The projection unit 70 has, instead of an integrator 16, see FIG. 1, for example, an LCD element 72, wherein an entrance surface of the LCD element 72 forms the aperture 14. In the beam path downstream of the reflector 4 and the discharge lamp, an optical element in the form of a lens 74 is arranged on the optical axis 18.

An optical element 76 in the form of a fly-eye of a polarizer or a dichroic mirror is provided between the lens 74 and the LCD element 72. The measuring unit 20 arranged around the LCD element 72 detects the light radiating past the LCD element 72, in accordance with the previous embodiments. If the light intensity distribution or the position of a hot spot changes, then the lens 74 is adjusted by means of one or more motors 78, in particular stepper motors, in such a way that the highest light intensity or the hot spot is again arranged approximately centrally on the LCD element. The motor or motors 78 is/are connected to the evaluation and control unit 24 via electrical lines 80.

A fifth embodiment of a projection unit 82 is depicted in a schematic illustration in FIG. 8. This involves a graphical optical blackout (Gobo) projection unit. Projection units of this type are sufficiently known from the prior art, for which reason only what is essential to understanding the disclosure is presented below and reference is made to the prior art for more extensive explanations. The Gobo projection unit 82 is preferably used for advertizing purposes (for example for projecting company logos or advertizing messages) and for entertainment purposes, such as a moving head.

In contrast to the DLP projection unit 1 from FIG. 1, the projection unit 82 does not have an integrator 16, but rather an aperture 84, downstream of which a Gobo wheel 86 is disposed. The aperture 84 is delimited by an inner lateral cylindrical surface 88—substantially having a circular-cylindrical cross section—of the holding plate 90 of the measuring unit 92, the longitudinal axis of which runs approximately coaxially with respect to the optical axis 18. At a distance from the measuring unit 92 with the aperture 84, the Gobo wheel 86 is then disposed downstream thereof.

FIG. 9 illustrates the aperture 84 together with the measuring unit 92 in a front view. The circular cross-sectional area of the aperture 84 can be discerned here. The holding plate 90 of the measuring unit 92 has an annular cross section. Sensors 94, 96, 98 and 100 are arranged approximately in each case between the inner lateral cylindrical surface 88 of the holding plate 90 and an outer lateral cylindrical surface 102. In this case, the sensors 94 to 100 are arranged on a pitch circle in a manner offset by approximately 90° with respect to one another on the holding plate 90. The basic functioning of the projection unit 82 corresponds to that from the first embodiment in FIG. 1.

The projection units according to the disclosure from the figures explained above can be used particularly advantageously in multi-lamp systems, since here the effective aperture available per lamp is significantly reduced and the system is thus particularly susceptible to hot spot shifts.

In a further embodiment of the disclosure, it would be conceivable to provide a projection unit which does not have a measuring unit. In specific discharge lamps, the hot spot shift over the period of operation generally takes place in a specific direction, for example counter to the gravitational force. For discharge lamps of this type, part of the projection unit can then be shifted in order to change the light intensity distribution depending on the period of operation of the discharge lamp. For this purpose, the measurement signal of a position sensor can be used as control pulse of the evaluation and control unit for the setting unit. For projection units of this type, therefore, a curve of the type "average hot spot shift as a function of the period of operation" can be determined and the lamp position can be adapted on the basis of said curve.

In a further embodiment, it is conceivable to combine a sensor-based projection unit in accordance with the previous exemplary embodiments with a method for optimizing the electrode geometry in lamp operation. A method of this type is disclosed in WO 2010/086222 A1, for example. This involves a so-called reshape method for electrodes, which will be explained below. At the beginning of the time of operation of a discharge lamp, electrode tips of electrodes lying opposite one another have an optimum basic geometry that is stabilized over the longest possible period of time with the aid of the reshaping method disclosed in the cited document. Despite the reshaping method, over the duration of operation, a change and shift of the electrode tips of the electrodes and thus of the light intensity distribution or of the hot spot will occur, which is compensated for by the sensor-based projection unit according to the disclosure. In the case of a long duration of operation, the electrodes generally have a greatly fissured surface, with only comparatively small and thin electrode tips of the electrodes. By means of the reshaping method disclosed in the cited document, in this state it is possible to achieve melting over the electrodes, with the advantage that this provides the prerequisites for renewed growth of electrode tips with a more advantageous geometry. However, the location on the electrode head of a respective electrode at which this growth takes place cannot be unambiguously predicted, and so the sensor-based projection unit can advantageously be used at this location, too, in order to arrange the hot spot centrally again with respect to the aperture.

In the case of pivotable projection systems, for example effect lighting devices in the entertainment industry, on account of gravitational action, there is a change in the exact position and form of the arc between the electrodes and thus in the light intensity distribution depending on the spatial orientation of the discharge lamp. Consequently, there is the possibility, even without directly measuring a change in the light intensity distribution, merely on the basis of a measured positional orientation (e.g. by determining the installation angle or by means of a gyrosensor) of the effect lighting device, by means of the setting unit described, of correspondingly driving the lamp-reflector arrangement, such that the maximum of the light intensity distribution becomes located within the aperture opening again. In this case, it is possible to use control parameters which are determined for each type of lamp, including in a manner dependent on the duration of operation, and are made available as controlled variables in look-up tables (LUT), for example.

The method described here is therefore also suitable for compensating for, that is to say in particular dynamically readjusting, the disadvantageous effects of an arc deformation on the basis of the instantaneous positional orientation of the lamp module.

It is also conceivable to provide as measuring unit in the embodiments explained above one which has light sensors or a camera that measures useful light arriving at a projection screen.

A projection unit including a light-emitting lamp, in particular a discharge lamp, is disclosed. In this case, the light radiates toward an aperture. The projection unit has a setting unit, with which a light intensity distribution or a hot spot of the emitted light is adjustable in the direction of at least one axis relative to the aperture. The light intensity distribution can be adjusted depending on a period of operation and/or a positional orientation of the lamp. Additionally or alternatively, a measuring unit can be provided, with which a change in the hot spot or the light intensity distribution over the duration of operation of the discharge lamp can be ascertained. If such a change is ascertained, then the position of the light intensity distribution or of the hot spot is adjusted by the setting unit depending on this change.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A projection unit comprising a reflector-lamp arrangement which is designed to emit light during operation, wherein the light radiates toward an aperture, wherein a setting unit is provided, with which a light intensity distribution of the emitted light is adjustable relative to the aperture, wherein the light intensity distribution is adjusted depending on a period of operation of the lamp, or a measuring unit is provided, with which at least part of the light intensity distribution is detectable, wherein the light intensity distribution is adjusted relative to the aperture depending on a change in the light intensity distribution, provision is made of a control unit is configured to control the setting unit, which controls the setting unit depending on the light intensity distribution detected by the measuring unit or depending on the period of operation of the lamp.

2. The projection unit as claimed in claim 1, wherein the setting unit adjusts the light intensity distribution of the emitted light relative to the aperture in such a way that a maximum of the light intensity distribution substantially lies in the aperture.

3. The projection unit as claimed in claim 1, wherein the measuring unit detects at least part of the light intensity distribution of a part of the light that does not radiate through the aperture.

4. The projection unit as claimed in claim 1, wherein the measuring unit has a plurality of sensors which detect the light intensity distribution, wherein the sensors are arranged outside the aperture.

5. The projection unit as claimed in claim 1, wherein for adjusting the light intensity distribution relative to the aperture, a position of the lamp or of an optical element, or of the aperture can be changed by the setting unit.

6. The projection unit as claimed in claim 1, wherein the setting unit has at least one motor which, for the purpose of adjusting the light intensity distribution, can be used to change the position of a lamp housing of the lamp or of the optical element or of the aperture or the position of the lamp in relation to the reflector.

7. The projection unit as claimed in claim 1, wherein the setting unit is designed as a pivoting unit, which, for the purpose of adjusting the light intensity distribution, can be used to pivot the lamp housing of the lamp or the optical element or the aperture or the position of the lamp in relation to the reflector.

8. The projection unit as claimed in claim 1, wherein said projection unit is a digital light processing projection unit or a liquid crystal display projection unit or a liquid crystal on silicon projection unit or a graphical optical blackout projection unit.

9. The projection unit as claimed in claim 1, wherein said projection unit is designed as a multi-lamp system.

10. The projection unit as claimed in claim 1, wherein the lamp has electrodes whose geometry can be changed by a reshape method.

11. The projection unit as claimed in claim 1, wherein the light intensity distribution is adjustable by the setting unit relative to the aperture in an aperture plane approximately in $\frac{1}{10}$ mm steps.

12. The projection unit as claimed in claim 1, wherein the reflector-lamp arrangement comprises a discharge lamp.

13. The projection unit as claimed in claim 4, wherein the sensors are light sensors or temperature sensors or a camera.

14. The projection unit as claimed in claim 6, wherein the at least one motor is an electrical stepper motor.

15. The projection unit as claimed in claim 9, wherein said projection unit is designed as a double- or quadruple-lamp arrangement.

16. A method for controlling a projection unit, the projection unit comprising a reflector-lamp arrangement which is designed to emit light during operation, wherein the light radiates toward an aperture, wherein a setting unit is provided, with which a light intensity distribution of the emitted light is adjustable relative to the aperture, wherein the light intensity distribution is adjusted depending on a period of operation of the lamp, or a measuring unit is provided, with which at least part of the light intensity distribution is detectable, wherein the light intensity distribution is adjusted relative to the aperture depending on a change in the light intensity distribution, the method comprising:

detecting at least part of the light intensity distribution by means of the measuring unit, and evaluating the light intensity distribution by means of an evaluation unit for the purpose of detecting changes in the light intensity distribution.

17. The method as claimed in claim 16, further comprising at least one of:

adjusting the light intensity distribution of the emitted light relative to the aperture by means of the setting unit for the purpose of compensating for changes in the light intensity distribution; and adjusting the light intensity distribution of the emitted light relative to the aperture by means of the setting unit depending on the period of operation.

\* \* \* \* \*